March 25, 1941.  W. P. GOODENOUGH ET AL  2,236,314
CLUTCH
Filed March 26, 1940
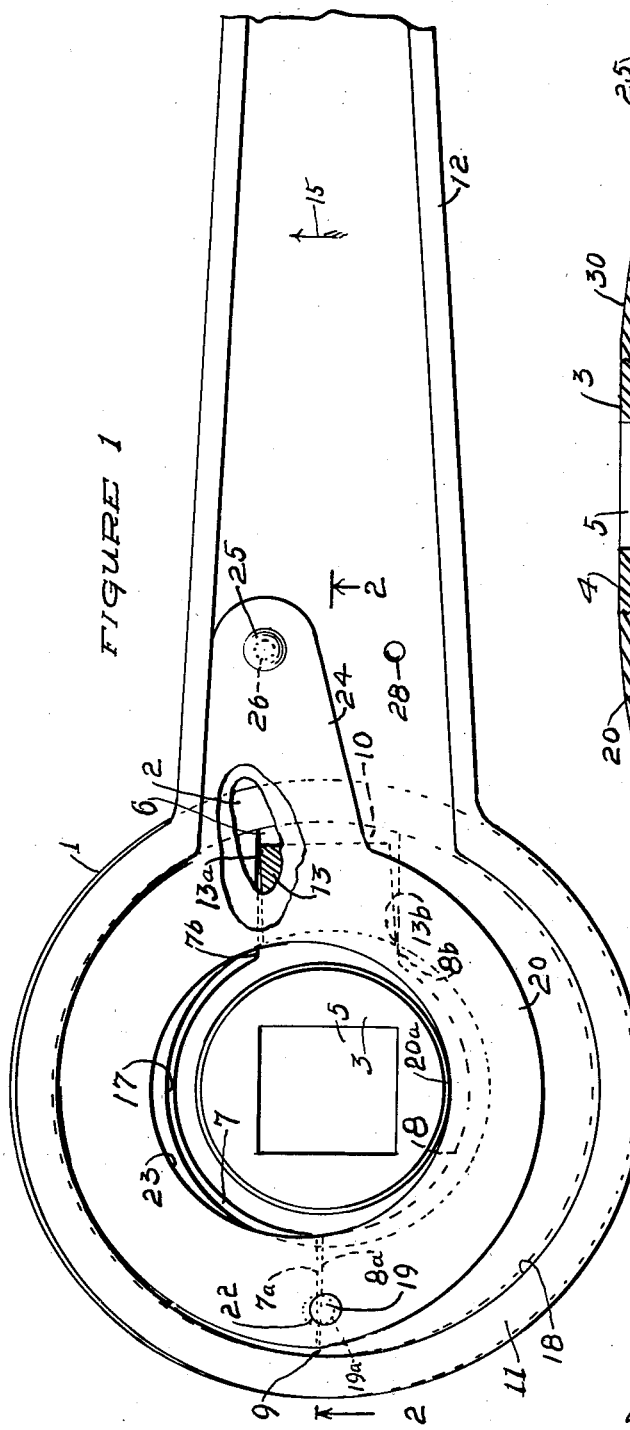
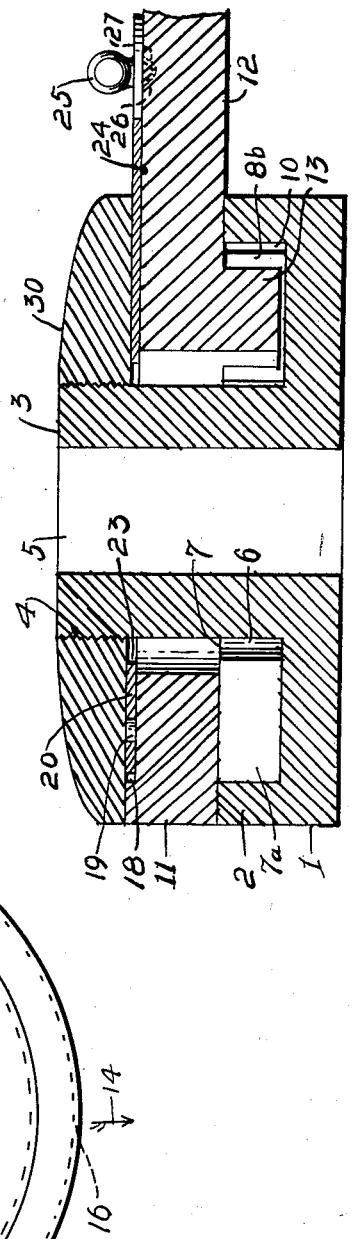
INVENTORS
Wells P. Goodenough
Henry E. Jensen
John A. Naismith
ATTORNEY Patented Mar. 25, 1941

2,236,314

UNITED STATES PATENT OFFICE 2,236,314

CLUTCH

Wells P. Goodenough and Henry E. Jensen, Palo Alto, Calif.

Application March 26, 1940, Serial No. 326,010

3 Claims. (Cl. 192—43)

The present application relates to a clutch applicable to machinery of various types where precision is required in the step-by-step movement of machine parts or work operated upon, and to various types of tools such as wrenches. Reference is made to our copending application for a somewhat similar clutch and bearing Serial No. 265,253, filed March 31, 1939.

In the operation of machines where it is necessary for a shaft to rotate intermittently through definite fixed arcs, for instance, it has heretofore been customary to effect the driving of the shaft by means of various arrangements of gears. While such mechanism may be accurate and positive when first put into use, the fine accuracy desired is soon lost because of lost motion developing through the wearing of contacting surfaces. Likewise in certain tools, as in wrenches, there is lost motion in adjustment and in operation, particularly in the type designated for use in limited space.

It is one object of the present invention to provide a clutch so constructed and arranged that it may be used to apply power to a part to be rotated without any loss of motion, and that will maintain this characteristic throughout its active life.

It is another object of the invention to provide a device of the character indicated that may be quickly and easily moved in the reverse to its operative direction without developing any lost motion to interfere with its prompt and accurate action when the power is again applied to move it in its operative direction.

It is a further object of the invention to provide a clutch of the character indicated and including frictionally engaging driving and driven members, wherein the frictional engagement of the said parts may be quickly, easily, and positively relieved without the development of lost motion, to permit rotation of the driving member in an inoperative direction.

It is still another object of the invention to provide a clutch of the character indicated that may be quickly and easily adjusted for the application of power in either direction without the necessity of removing it from its working position.

Finally, it is an object of the invention to provide means of the character indicated that is economical to manufacture, that consists of few and simple parts, that is simple in form and construction, strong and durable, positive in operation, and highly efficient in its practical application.

Figure 1 is a plan view of a device embodying our invention, with the cap removed, and with parts broken away.

Figure 2 is a sectional view on line 2—2 of Figure 1.

In the particular embodiment of the invention herein disclosed, we show at 1 a disc having at 2 a circular peripheral flange, and at 3 an axially disposed hub portion disposed on the same side of the disc as the flange and threaded on its outer end as at 4. The passage 5 passing axially through the hub portion 3 is to provide means whereby the device may be fitted with a tool or mounted upon a shaft for any desired purpose.

In the circular space 6 between the flange 2 and the hub portion 3 are placed two clutch members as 7 and 8. Each clutch member is substantially semi-circular in form and has sliding engagement with the flange 2. These clutch members are identical in form and size and are placed in the space 6 with their ends 7a and 8a in contact at 9, their other ends as 7b and 8b being spaced apart to form a pocket 10, diametrically opposite the point 9.

At 11 is shown a flat disc, circular in form and having an outside diameter equal to that of disc 1, and provided with a handle 12. On the underside of the disc 11 is formed a boss 13, and this boss is of such a size and so positioned as to fit in and substantially fill the pocket 10. This boss is designed to function as a spreader and fits in the pocket 10 so closely that if the lever 11—12 is turned slightly on the boss 13 as a pivot it operates to bring opposite corners of the boss into engagement with opposing ends of the clutch members.

If, for instance, the disc 11 is pushed in the direction indicated by arrow 14 the corners 13a and 13b are caused to bear against the ends 7b and 8b of the clutch members and to press the said clutch members tightly against the flange 2 so that the part 1—4 will turn as a unit with the lever 11—12 when power is applied to the handle in the direction indicated by the arrow 15. The swinging movement of the disc 11 relative to the underlying disc 1 is slight because the members 7—8 fit closely in the flange 2 and the boss 13 fits closely between the ends of the clutch members. The displacement of the disc 11 relative to the disc 1 when the parts are adjusted as above described is shown at 16. The disc 11 has a central hole formed therethrough to encompass the hub portion 3 as at 17, and of any size to permit the desired movement of the disc.

In the top or upper side of the lever 11—12 is formed a recess 18, and disposed in this recess is a pivot pin 19. The pin 19 is disposed at a point on the lever adjacent the edge remote from handle 12 and lies in the plane bisecting the lever longitudinally at right angles to the plane of its movement.

At 20 is shown a thin adjusting disc or lever having a thickness substantially equal to the depth of the recess 21 and having pivotal engagement with the pin 19 as shown at 22. The member 20 has a central opening formed therein as at 23, this opening being of such a size that the disc will contact the central hub 3 when adjusted to the limit of its movement in either direction about the pivot pin 19. The disc 20 is provided with an arm 24 and a handle 25, and is also provided with a projection 26 on the underside of the arm to engage spaced sockets as 27 and 28 in handle 12.

A cap member 30 is screwed into position on the hub 3 to seat on the outer edge of member 11 as shown and thereby securely hold the assembled parts in their proper relative positions.

The several parts of the device are so proportioned and associated that when the disc 20 is swung into the position shown it will contact the hub 3 at 20a. Operating upon this point as a fulcrum it shifts its pivotal point or mounting 19 from its central position shown in dotted lines at 19a, moving said pivot laterally to the position shown in solid lines, and consequently imparting a like movement or change of position to the disc 11 upon which the pin 19 is mounted. This shifting of the position of the disc 11 turns the boss 13 into the angular position shown wherein it applies pressure to the clutch members and causes them to engage the flange 2 of part 1. Moving the arm 24 into longitudinal alignment with the handle 12 will relieve the pressure on the clutch members so that the handle 12 may be swung in either direction without imparting motion to part 1, but moving the arm into engagement with socket 28 will reverse the action above described.

Although a certain specific embodiment of the invention has been illustrated and described, it will be understood that various alterations in the details of construction and mode of assembly may be made without departing from the scope of the invention as indicated in the accompanying claims.

We claim:

1. A clutch comprising, an annular driven element, a pair of segmental shoes disposed within said element to bear against the same and fulcrumed on each other at one end, a cam inserted between the other ends of said shoes and constructed and arranged to bring diametrically opposite points into contact with the shoes when moved in either direction about its axis, a lever movable as a unit with the cam to move the same in either direction and in part overlying the shoes, and a central portion fixedly and concentrically disposed on the driven element; an adjusting lever pivotally mounted on the first named lever and having parts overlying opposite sides of the said central portion and so spaced from each other that movement of the adjusting lever in either direction about its pivot will bring one side part into engagement with the fixed central portion and shift the pivot and its supporting lever laterally with respect to the fixed central portion and actuate the cam to spread the shoes.

2. In a device of the character described including a driven element having a fixed central element and a concentric flange, friction shoes disposed within the flange and a lever-actuated shoe-spreading cam disposed between the shoes; a cam lever operatively connected to said cam; an adjusting lever pivotally mounted on the cam lever and having parts overlying opposite sides of the said central portion and so spaced from each other that movement of the adjusting lever in either direction about its pivot will bring one side part into engagement with the fixed central portion and shift the pivot and its supporting lever laterally with respect to the fixed central portion and so actuate the cam to spread the shoes.

3. A clutch comprising, a revoluble member having an annular internal bearing surface and a concentrically disposed central abutment portion spaced therefrom, a pair of shoes disposed in the space between the surface and abutment portion to bear against opposed portions of said surface, said shoes being fulcrumed at one end, a cam inserted between the other ends of said shoes, said cam being constructed and arranged to bring diametrically opposite points thereof into contact with said shoes when said cam is moved in either direction about its axis, a lever operable as a unit with said cam to adjust the same and in part overlying said shoes, and means maintaining said lever in a position to keep one pair of points on said cam in actuating engagement with said shoes.

WELLS P. GOODENOUGH.
HENRY E. JENSEN.